July 10, 1951
B. SECKER
2,559,680
FREQUENCY MEASURING APPARATUS
Filed May 20, 1947
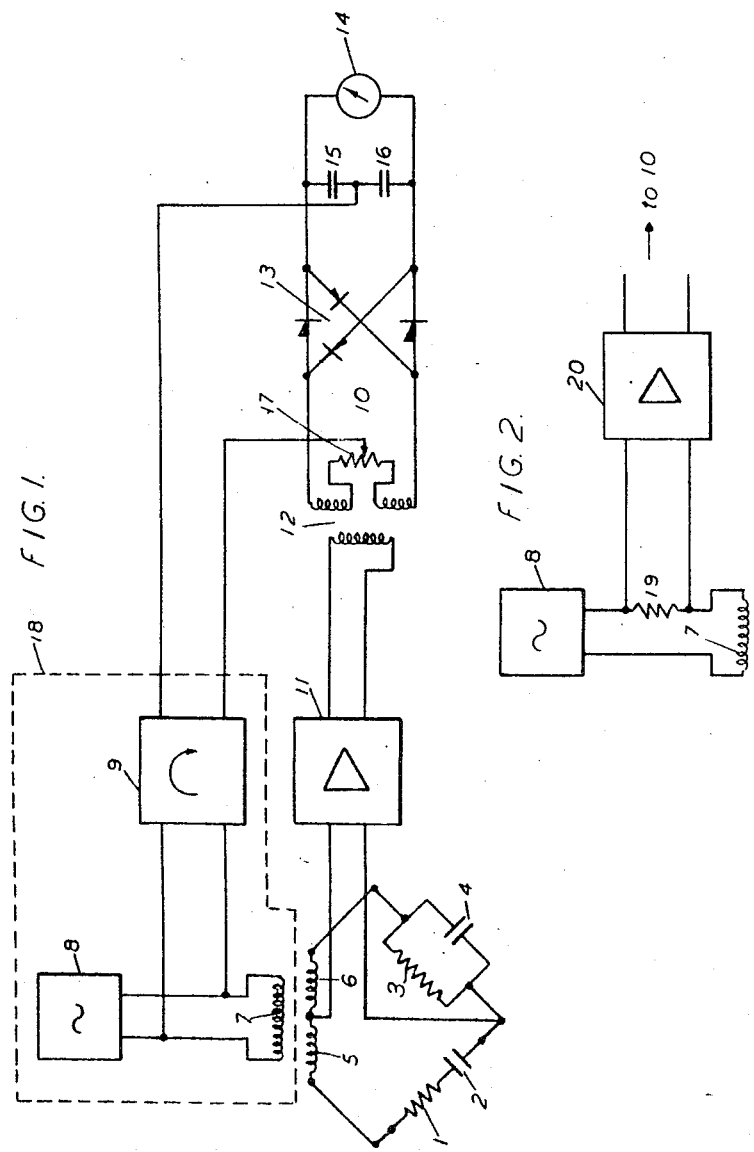
Inventor
Ben Secker
By
Attorney

Patented July 10, 1951

2,559,680

UNITED STATES PATENT OFFICE 2,559,680

FREQUENCY MEASURING APPARATUS

Ben Secker, London, England, assignor, by mesne assignments, to International Standard Electric Corporation, New York, N. Y., a corporation of Delaware Application May 20, 1947, Serial No. 749,322
In Great Britain September 6, 1945

Section 1, Public Law 690, August 8, 1946
Patent expires September 6, 1965

4 Claims. (Cl. 172—245)

The present invention relates to electrical Wheatstone bridge arrangements for measuring frequency differences by means of impedance differences, and is principally concerned with arrangements for the direct indication of such frequency differences.

The invention employs the same principles as the invention described in the specification accompanying British Pat. No. 579,530, and the principal object is to provide a simple and inexpensive method of checking and calibrating or adjusting oscillation generators where an accuracy of not more than about ½% is required.

Accordingly, the invention provides an electrical arrangement for measuring the deviation of the frequency of an alternating voltage wave from a standard frequency, comprising a Wheatstone bridge circuit, means for connecting two dissimilar impedances respectively in two arms of the bridge, means for applying the said voltage wave to the input terminals of the bridge circuit, the dissimilar impedances being such that the bridge is balanced when the frequency of the wave is equal to the standard frequency, and means for indicating the value of the voltage appearing at the output terminals of the bridge circuit.

The invention also provides an electrical arrangement for measuring the deviation from a specified frequency of the frequency of the alternating voltage generated by an electrical oscillator, comprising an equal ratio Wheatstone bridge circuit, means for connecting two dissimilar impedances which are equal at the specified frequency respectively in two adjacent arms of the bridge, means for connecting the output terminals of the oscillator to the input terminals of the bridge circuit, and means for indicating the value of that component of the output voltage of the bridge circuit which is in quadrature with the input voltage.

According to another aspect the invention covers an electrical arrangement for measuring the deviation from a specified frequency of the frequency of the alternating voltage generated by an electrical oscillator, comprising means for connecting the oscillator to the input terminals of an equal ratio Wheatstone bridge circuit having in one arm a first resistance connected in series with a first condenser and in an adjacent arm a second resistance connected in parallel with a second condenser, the values of the said resistances and the capacity of the said condensers being chosen so that the bridge is balanced at the specified frequency, and means for simultaneously applying voltages proportional to the input and output voltages of the bridge circuit to a balanced modulator having a direct current instrument connected thereto in such manner that the said instrument indicates the value of the output voltage component which is in quadrature with the input voltage.

According to another view the invention provides an electrical arrangement for measuring the deviation from a specified frequency of the alternating voltage generated by an electrical oscillator, comprising means for connecting the oscillator to the input terminals of an equal ratio Wheatstone bridge circuit, having in one arm a first resistance connected in series with a first condenser and in an adjacent arm a second resistance double the first resistance in parallel with a second condenser of capacity half that of the first condenser, the values of the resistances and condensers being also so chosen that the bridge is balanced at the said specified frequency, a balanced modulator having a direct current indicating instrument connected thereto, means for applying to the said modulator a voltage proportional to and in phase with the bridge output voltage, and means for simultaneously applying to the said modulator a voltage proportional to and in phase with the current supplied to the input terminals of the bridge circuit from the oscillator.

The invention will be described with reference to the accompanying drawing, of which Fig. 1 shows a schematic circuit diagram of an embodiment of the invention, and Fig. 2 shows a minor modification of Fig. 1.

In Fig. 1, a Wheatstone bridge of the Wien type has two adjacent arms, one of which contains a resistance 1 in series with a condenser 2 and the other a resistance 3 in parallel with a condenser 4. The remaining pair of arms are occupied by two equal secondary windings 5 and 6 of a transformer of which 7 is the primary winding. The two windings 5 and 6 should be closely coupled and accurately balanced, and should be connected in a series aiding connection.

The output of an oscillator 8, the frequency of which is to be tested, is connected to the winding 7 and also through a phase changer 9 to the carrier wave input circuit of a balanced modulator 10. The input of the phase changer is connected in parallel with the winding 7 as shown. The junction point of the windings 5 and 6, and the corresponding opposite diagonal point of the bridge, are connected through an amplifier 11 to the signal wave input circuit of the modulator 10.

This modulator is similar to one of those shown, for example, in Fig. 4 of the above-mentioned specification, and comprises a transformer 12 connected to four rectifiers arranged effectively as a ring modulator 13 and thence to an indicating direct current meter 14 shunted by two equal by-pass condensers 15 and 16 connected in series. The secondary winding of the transformer 12 is divided into two equal halves, and a potentiometer 17 is inserted between them. The output of the phase changer 9 is connected to the junction point of the two condensers 15 and 16, and to the adjustable contact of the potentiometer 17.

Let $\omega$ be $2\pi$ times any frequency generated by the oscillator 8, and let $\omega_0$ be $2\pi$ times the frequency at which the bridge is balanced. Let $R_1$ and $R_2$ be the resistance values of elements 1 and 3 and let $C_1$ and $C_2$ be the capacities of the condensers 2 and 4. Let $E$ be the electromotive force developed in the windings 5 and 6, and let $V$ be the potential difference at the input of the amplifier 11.

Let $Z_1$ be the impedance of the elements 1 and 2 in series, and let $Z_2$ be the impedance of the elements 3 and 4 in parallel. Then $$Z_1 = (1+j\omega R_1 C_1)/j\omega C_1$$

and $$Z_2 = R_2/(1+j\omega R_2 C_2)$$

Then $$\frac{V}{E} = \frac{Z_1-Z_2}{Z_1+Z_2} = \frac{1-R_1R_2C_1C_2\omega^2+j\omega(R_2C_2+R_1C_1-R_2C_1)}{1-R_1R_2C_1C_2\omega^2+j\omega(R_2C_2+R_1C_1-R_2C_1)}$$

at balance $V=0$, and so $$\omega = 1/\sqrt{R_1R_2C_1C_2}$$

and $$R_2C_2 + R_1C_1 - R_2C_1 = 0$$

If $\omega_0/2\pi$ is the specified value of the frequency of the oscillator 8, the bridge will be arranged to be balanced at $\omega_0$ so $R_1R_2C_1C_2 = 1/\omega_0^2$ and so it follows that $$\frac{V}{E} = \frac{1-\omega^2/\omega_0^2}{1-\omega^2/\omega_0^2+2j\omega(R_1C_1+R_2C_2)}$$

$$= \frac{1}{1+\dfrac{2j\omega_0\sqrt{(R_1C_1-R_2C_2)^2+4R_1R_2C_1C_2}}{\omega_0/\omega - \omega/\omega_0}}$$

This shows that $$\frac{V}{E}$$

is a maximum when $R_1C_1 = R_2C_2$ then $$\omega_0 = 1/R_2C_2$$
$$R_2 = 2R_1$$

and $$C_2 = \tfrac{1}{2}C_1$$

Since at balance $Z_1=Z_2$, the impedance of the bridge as seen from the oscillator 8 will be $2nZ_2$ where $n$ is the impedance ratio of the transformer, and since $Z_2 = R/(1+j\omega R_2 C_2)$ it follows that at the balance frequency $\omega_0$ the impedance of the bridge as seen from the oscillator 8 has a phase angle of 45°, when the bridge impedances are chosen for maximum senitivity. Under these conditions $$\frac{V}{E} = \frac{1}{1+\dfrac{4j}{\omega_0/\omega - \omega/\omega_0}}$$

If the actual frequency generated by the oscillator 8 be written $\omega = \omega(1-a)$, where $a$ is small compared with 1, then $$\frac{V}{E} = \frac{1}{1+2j/\omega a} = \frac{a}{2j} \text{ approx.}$$

Thus when the bridge impedances are chosen for maximum sensitivity, the output voltage from the bridge differs in phase by 90° from the input voltage, and is proportional to the percentage frequency difference from the balance frequency of the bridge.

Referring to Fig. 1, it will be clear that in order to get a maximum reading on the instrument 14, the phase changer 9 should be adjusted to produce a phase change of 90°. The reading will then be proportional to $a$, and the meter 14 could be calibrated to read frequency differences directly if desired.

It is, of course, not essential that the elements 1, 2, 3, 4 should be chosen for maximum sensitivity, but they should be such that the bridge is balanced at the specified oscillator frequency $\omega$. If they are not chosen to meet the maximum sensitivity condition, then the angle of $V/E$ will not in general be 90° so that the phase changer 9 will need a different adjustment for maximum reading of the meter 14.

It was pointed out above that under the maximum sensitivity condition the angle of the impedance of the bridge as seen from the oscillator 8 is 45° at $\omega_2$. A minor variation of the invention makes use of this property. Fig. 2 shows the corresponding modification of that part of Fig. 1 inside the dotted outline 18.

A resistance 19 is included in series between the oscillator 8 and the winding 7, and the terminals of this resistance are connected through a suitable amplifier 20 to the carrier wave input terminals of the modulator 13. No phase changer is necessary in this case because the voltage applied to the carrier wave input terminals will be proportional to the current supplied to the bridge from the oscillator, instead of to the voltage, and since under the maximum sensitivity condition the phase angle of the bridge impedance is 45°, it is evident that the two voltages applied to the modulator 10 will differ in phase by 45°. The rectified current applied to the instrument 14 will accordingly be about 70% of the maximum possible current obtained if the two voltages were in phase.

It is evident that a phase changer such as 9 could be included in Fig. 2 if desired in order to bring the two voltages into the same phase, but quite satisfactory results would be obtained without it. In Fig. 1, also an amplifier such as 20 could evidently be included before or after the phase changer 9 if desired, or in either case the amplifier could include the phase changing means.

It will be clear that the circuit which has been described with reference to the accompanying drawing is in principle the same as the arrangement of Fig. 4 of the above-mentioned specification, except that only one modulator and indicator is used. The circuit indicates the frequency difference by means of the impedance difference produced between the two arms of the bridge by a small change in the frequency, and the impedances of these arms have simply been suitably chosen so that a relatively large difference is produced by the change of frequency. As in the said Fig. 4, the quantity primarily indicated on the meter 14 is an impedance difference, and this impedance difference is made proportional to the frequency difference by suitable choice of the elements of the bridge arms.

It will be observed that in the case of Fig. 1 it is the quadrature component of the bridge output voltage which is employed to indicate the frequency difference. When the maximum sensitivity condition is satisfied, the other component is substantially zero.

The elements 1 to 6 may be made adjustable in order to make the circuit adaptable for various frequencies. If as is preferable the elements are selected for the maximum sensitivity condition, then the adjustment for changing the balance frequency is most conveniently made by keeping $R_1$ and $R_2$ fixed and by adjusting $C_1$ and $C_2$, preferably simultaneously by a ganging or like arrangement, so that $C_1=2C_2$. Then not only is the maximum sensitivity condition fulfilled, but also the impedances $Z_1$ and $Z_2$ will be maintained constant irrespective of the balance frequency, so that the load on the oscillator 8 will be the same in all cases.

It will be understood that, while a particular series of impedance elements 1, 2, 3, 4 has been shown in Fig. 1, other elements could be used. Moreover, the bridge need not be an equal ratio bridge, and the two arms containing the impedance elements are not necessarily adjacent arms. What is necessary is (a) that the impedances in the two bridge arms should be such that the bridge is balanced at $\omega_0$, and (b) that the impedances should vary with frequency in such a manner that the bridge becomes unbalanced at other frequencies. For convenience, impedances having the property (b) will be called "dissimilar."

What is claimed is:

1. An electrical arrangement for measuring the deviation from a specified frequency of the frequency of the alternating voltage generated by an electrical oscillator, comprising means for connecting the oscillator to the input terminals of an equal ratio Wheatstone bridge circuit having in one arm a first resistance connected in series with a first condenser and in an adjacent arm a second resistance connected in parallel with a second condenser the values of the said resistances and the capacities of the said condensers being chosen so that the bridge is balanced at the specified frequency, a phase shifter having its input connected across said oscillator for producing an alternating voltage shifted 90° in phase relative to the oscillator alternating voltage, means for simultaneously applying a voltage proportional to the output voltages of the bridge circuit and of the phase shifter to a balanced modulator having a direct current instrument connected thereto in such manner that the said instrument indicates the value of the oscillator output voltage component which is in quadrature with the phase shifter output voltage.

2. An electrical arrangement for measuring the deviation from a specified frequency of the frequency of the alternating voltage generated by an electrical oscillator, comprising means for connecting the oscillator to the input terminals of an equal ratio Wheatstone bridge circuit having in one arm a first resistance connected in series with a first condenser and in an adjacent arm a second resistance double the first resistance in parallel with a second condenser of capacity half that of the first condenser, the values of the resistances and capacities being also so chosen that the bridge is balanced at the said specified frequency, a balanced modulator having a direct current indicating instrument connected thereto, means for applying to the said modulator a voltage proportional to and in phase with the bridge output voltage, and means for simultaneously applying to the said modulator a voltage proportional to and in phase with the current supplied to the input terminals of the bridge circuit from the oscillator.

3. An arrangement according to claim 1 in which the second resistance is double the first resistance, and in which the capacity of the second condenser is half the capacity of the first condenser.

4. An arrangement according to claim 2 comprising means for simultaneously adjusting the two condensers so that the capacity of the second is always half that of the first.

BEN SECKER.

REFERENCES CITED

The following references are of record in the file of this patent:

UNITED STATES PATENTS

| Number | Name | Date |
|---|---|---|
| 1,751,538 | Wunsch | Mar. 25, 1930 |
| 1,983,447 | Field | Dec. 4, 1934 |

OTHER REFERENCES

Publication "Electronics," March 1945.